United States Patent Office 3,317,490
Patented May 2, 1967

3,317,490
NOVEL INTERPOLYMER AND ITS PREPARATION
Rostyslaw Dowbenko, Gibsonia, Pa., assignor to Pittsburgh Plate Glass Company, Pittsburgh, Pa., a corporation of Pennsylvania
No Drawing. Filed Apr. 26, 1963, Ser. No. 276,071
4 Claims. (Cl. 260—79.3)

This invention relates to novel interpolymers produced from 1,5-cyclooctadiene and sulfuryl chloride.

While cyclic alkenes such as cyclohexene generally form 1:1 addition products with various reactive compounds, it has recently been discovered that 1,5-cyclooctadiene does not react in certain instances to produce the analogous addition compounds. Thus, it has been found that upon reaction with compounds such as polyhalomethanes, carboxylic acid amides, aldehydes and lactones, 1,5-cyclooctadiene undergoes transannular rearrangements to produce bicyclo[3.3.0]octane derivatives.

It has now been further discovered that the reaction of 1,5-cyclooctadiene with sulfuryl chloride ($SO_2Cl_2$) produces a novel interpolymer, and that the interpolymer appears to contain sulfur and recurring bicyclo[3.3.0]octane groups in the polymer chain.

When the polymerization reaction is carried out in the manner described herein, the polymers produced are believed to contain recurring units in which bicyclo[3.3.0]octane groups and sulfuryl radicals ($-SO_2-$) are connected, the points of attachment to the bicyclo[3.3.0]octane nucleus being in the 2-position and the 6-position. These recurring units have the structure:

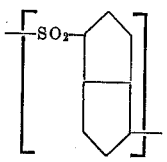

The molecular weight of the polymer, and thus the number of these recurring units in each polymer chain, varies with the conditions under which the polymerization reaction is carried out. Relatively low molecular weight products are often obtained, for example, a product containing three bicyclo[3.3.0]octane groups and thus having the over-all structure:

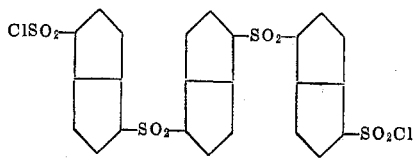

However, other polymers having varying numbers of these groups may also be produced in accordance with the invention and can be represented by the generalized formula:

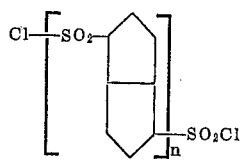

In the foregoing formula, n can be as low as 2 or as high as about 25 or higher. Thus, the molecular weight of the polymeric products is generally within the range of about 450 to about 4500.

The reaction conditions necessary to produce polymers as described above are not critical. The polymerization reaction is usually carried out utilizing conditions at which free radical initiated addition reactions take place.

A catalyst as such is not necessary, the polymerization reaction taking place when the 1,5-cyclooctadiene and sulfuryl chloride are admixed at elevated temperatures of at least about 50° C. However, a catalyst may be employed if desired, and when a catalyst is used, the preferred temperature is one at which the catalyst yields free radicals at an appreciable rate.

For purposes of describing the invention, ultraviolet light is considered as a catalyst and the use of ultraviolet light as a catalytic agent is the preferred manner of carrying out the polymerization. Utilizing ultraviolet light, the polymerization reaction can be carried out at quite low temperatures, i.e., about 0° C. or even lower, thus affording ease of control of the reaction. Other known free radical producing catalysts may also be employed, including, for example, peroxides such as benzoyl peroxide and ditertiary butyl peroxide; azo compounds such as azobis(isobutyronitrile) and the like. When such a catalyst is employed, the reaction is generally carried out using at least about 0.02 mole percent catalyst based on the 1,5-cyclooctadiene present, although lower amounts can be employed if desired, and any amount in excess can be used.

A solvent is not necessary in carrying out the reaction; however, because the reaction is exothermic, it is often desirable to include a solvent in the reaction mixture. Any substantially inert solvent can be employed, although chlorinated hydrocarbons are generally preferred in order to minimize any possible contamination of the product by interaction of the solvent and the sulfuryl chloride.

Set forth below are several examples illustrating the method of producing the polymers of the invention.

Example 1

A glass reaction vessel was charged with 43.2 parts of 1,5-cyclooctadiene and 80 parts of carbon tetrachloride, which were then cooled to 5° C. While irradiating the vessel with ultraviolet light, 27 parts of sulfuryl chloride were added slowly over a period of 2 hours and 15 minutes, with the temperature being maintained at about 5° C. After the addition was complete, the reaction mixture was stirred at 5° C. for 6 hours while under ultraviolet light, and then warmed to room temperature. A dark solid had precipitated during the reaction, which was recovered by filtration and washed with ether and dried. This product had a melting point higher than 228° C. and was soluble in acetone, but insoluble in ether and petroleum ether. It was identified by chemical and infrared analyses as being predominately the polymer of the following structure:

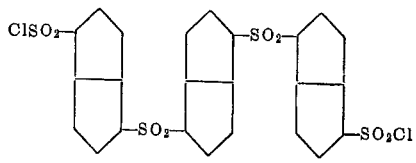

Analysis (calculated for $C_{24}H_{36}Cl_2O_8S_4$).—Calculated, percent: carbon, 44.23; hydrogen, 5.57; chlorine, 10.88; sulfur, 19.68. Found, percent: carbon, 40.36; hydrogen, 5.29; chlorine, 10.24; sulfur, 21.22.

Example 2

A glass reaction vessel was charged with 43.2 parts of 1,5-cyclooctadiene and heated to 69° C. While maintaining the reaction mixture at about 70° C., 27 parts of sulfuryl chloride were added slowly over a period of 55 minutes. Some gas, presumed to be hydrogen chloride, was evolved during the reaction. The mixture was stirred at 70° C. for an additional 30 minutes and then cooled. Upon distillation to remove the unreacted starting materials, the polymeric product was obtained.

In these and other tests, it was shown that polymeric products of 1,5-cyclooctadiene and sulfuryl chloride having varying molecular weights are obtained using various reaction conditions, catalysts and solvents in the manner described above.

The polymers obtained in accordance with this invention are useful in several ways. For example, they can be utilized in producing protective coatings on metal or other surfaces by applying thereto a layer of a suitably plasticized solution of the polymer, and drying. Coatings having differing properties are produced by including a diamine, such as hexmethylenediamine, or other cross-linking agent to the polymer solution and then curing the dried coating at elevated temperatures. Coating compositions usable in conventional ways may be produced by employing a solution of the above polymers as all or part of the vehicle, along with pigment and, if desired, additives such as anti-skinning agents, wetting agents, and the like.

According to the provisions of the patent statutes, there are described above the invention and what are now considered to be its best embodiments. However, within the scope of the appended claims, it is to be understood that the invention can be practiced otherwise than as specifically described.

I claim:

1. An interpolymer of 1,5-cyclooctadiene and sulfuryl chloride consisting essentially of recurring units of the structure:

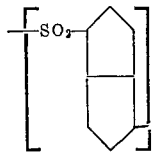

2. An interpolymer of the structure:

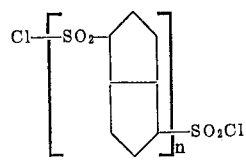

where $n$ is an integer from 2 to about 25.

3. A method of producing an interpolymer containing recurring bicyclo[3.3.0]octane groups, which comprises reacting 1,5-cyclooctadiene and sulfuryl chloride by a free radical-initiated reaction.

4. A method of producing an interpolymer of the structure:

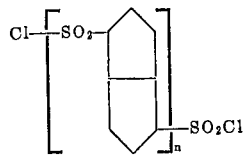

where $n$ is an integer from 2 to about 25, which comprises reacting 1,5-cyclooctadiene with sulfuryl chloride by a free radical-initiated reaction.

References Cited by the Examiner

UNITED STATES PATENTS

| | | | |
|---|---|---|---|
| 2,258,702 | 10/1941 | Frey et al. | 260—79.3 |
| 3,133,903 | 5/1964 | Frazer | 260—79.3 |

JOSEPH L. SCHOFER, *Primary Examiner.*

D. K. DENENBERG, *Assistant Examiner.*